United States Patent [19]

Olander

[11] 4,207,406

[45] Jun. 10, 1980

[54] PROCESS FOR PREPARING POLYPHENYLENE OXIDE COPOLYMERS

[75] Inventor: Walter K. Olander, Mt. Vernon, Ind.

[73] Assignee: General Electric Company, Pittsfield, Mass.

[21] Appl. No.: 904,272

[22] Filed: May 9, 1978

[51] Int. Cl.$^2$ .................. C08G 65/44; C08G 65/48
[52] U.S. Cl. .................. 525/391; 525/132; 525/392; 528/205; 528/215; 528/216; 528/217
[58] Field of Search .............. 528/205, 215, 216, 217; 260/874, 887; 525/132, 391, 392

[56] References Cited

U.S. PATENT DOCUMENTS

| | | | |
|---|---|---|---|
| 3,219,626 | 11/1965 | Blanchard et al. | 525/392 |
| 3,220,979 | 11/1965 | McNelis | 528/217 |
| 3,257,357 | 6/1966 | Stamatoff | 528/216 |
| 3,257,358 | 6/1966 | Stamatoff | 528/216 |
| 3,306,874 | 2/1967 | Hau | 528/215 |
| 3,306,875 | 2/1967 | Hay | 528/217 |
| 3,337,499 | 8/1967 | Bussink et al. | 525/392 |
| 3,342,892 | 9/1967 | Laakso et al. | 525/392 |
| 3,356,761 | 12/1967 | Fox | 525/392 |
| 3,382,212 | 5/1968 | Price et al. | 528/212 |
| 3,383,435 | 5/1968 | Cizek | 525/392 |
| 3,384,619 | 3/1968 | Hori et al. | 525/392 |
| 3,440,217 | 4/1969 | Faurote et al. | 525/392 |
| 3,442,885 | 5/1969 | Wieden et al. | 528/216 |
| 3,444,133 | 5/1969 | Behr et al. | 528/217 |
| 3,455,880 | 7/1969 | Kobayashi et al. | 528/217 |
| 3,573,257 | 3/1971 | Nakashio et al. | 528/217 |
| 3,787,361 | 1/1974 | Nakashio et al. | 525/392 |
| 3,956,242 | 5/1976 | Olander | 528/217 |

FOREIGN PATENT DOCUMENTS

| | | | |
|---|---|---|---|
| 48-26396 | 6/1973 | Japan | 528/216 |
| 48-26398 | 6/1973 | Japan | 528/216 |
| 1291609 | 10/1972 | United Kingdom | 525/391 |

*Primary Examiner*—Lester L. Lee
*Attorney, Agent, or Firm*—Morgan, Finnegan, Pine, Foley & Lee

[57] ABSTRACT

A process for preparing copolymers of polyphenylene oxide employing a manganese (II) chelate catalyst is disclosed as well as grafted copolymers thereof.

13 Claims, No Drawings

PROCESS FOR PREPARING POLYPHENYLENE OXIDE COPOLYMERS

BACKGROUND OF THE INVENTION

The polyphenylene oxides and methods for their preparation are known in the art and are described in numerous publications, including Hay U.S. Pat. Nos. 3,306,874 and 3,306,875. The Hay processes are based on the use of copper-amine complex catalysts. Manganese based catalysts for the oxidative coupling of phenolic monomers in the formation of polyphenylene oxides are disclosed in McNelis, U.S. Pat. No. 3,220,979; Nakashio, U.S. Pat. No. 3,573,257; Nakashio, U.S. Pat. No. 3,787,361 and Olander, U.S. Pat. No. 3,956,242. In the applicant's copending applications Ser. No. 491,475 filed July 24, 1974 and Ser. No. 534,903 filed Dec. 20, 1974, there are disclosed novel procedures for polymerizing polyphenylene oxides with complex manganese based catalysts. All of these patents and applications are hereby incorporated by reference.

In U.S. Pat. Nos. 3,444,133 and 3,455,880, there are disclosed manganese chelates of bis-salicylaldehyde ethylene diimine which are reported to be useful in the preparation of polyphenylene oxides. Japanese printed patent applications 26396/73 and 26398/73 also disclose catalysts which may be manganese or cobalt complexes of one or more compounds selected from the group consisting of primary amines and aliphatic, alicyclic and aromatic aldehydes.

SUMMARY OF THE INVENTION

The purpose of the present invention is to provide a process of preparing copolymers of polyphenylene oxides which comprises contacting a phenol having the formula:

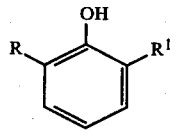

I wherein R and $R^1$ are hydrocarbon radicals, with an alpha-alkenyl phenol of the formula:

II wherein $R^2$ is alkyl having from 1 to 6 carbon atoms or vinyl and $R^3$ is an unsaturated hydrocarbon radical containing at least one polymerizable double bond in the hydrocarbon chain in the presence of a manganese (II) chelate complex catalyst having the formula $(L)_x$ Mn wherein L is a ligand derived from an W hydroxyoxime, Mn is the transition metal manganese (II) and x is a positive number at least equal to about 0.5, a solvent, a base and an oxygen containing gas under polymer forming conditions and thereafter recovering the polyphenylene oxide copolymer from the reaction mixture.

In addition, the present invention is concerned with processes for grafting polystyrene or butadiene onto the resulting polyphenylene oxide copolymer and recovering grafted copolymer.

DETAILED DESCRIPTION OF THE INVENTION

The presently disclosed method of synthesizing copolymers of polyphenylene oxides wherein one of the phenol reactants is an alpha-alkenyl phenol is rendered facilitated by the utilization of a manganese (II) chelate complex having the formula $(L)_x$ Mn wherein L is a ligand derived from an W-hydroxyoxime, Mn is the transition metal manganese (II) and x is a positive number at least equal to about 0.5, the latter catalyst described in detail in U.S. Pat. No. 3,956,242 exhibiting a high activity. Polyphenylene oxide functionalized with an olefin in this manner is capable of undergoing further chemical bonding or grafting and the preparation of such grafted copolymers are considered within the purview of this invention. Blends of these grafted copolymers, e.g. polyphenylene oxide-polystyrene possess superior impact properties over the unalloyed blends.

The process of this invention can be expressed by the following reaction schemes, illustrated by the reaction between 2,6-xylenol (A) and 2-allyl-6-methylphenol (B):

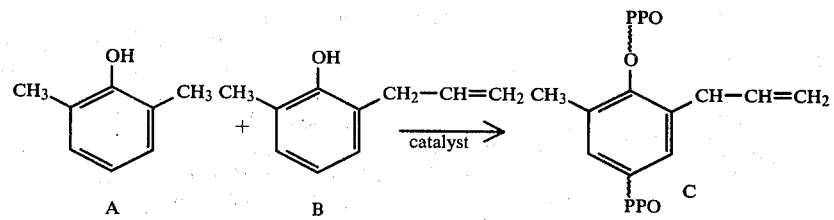

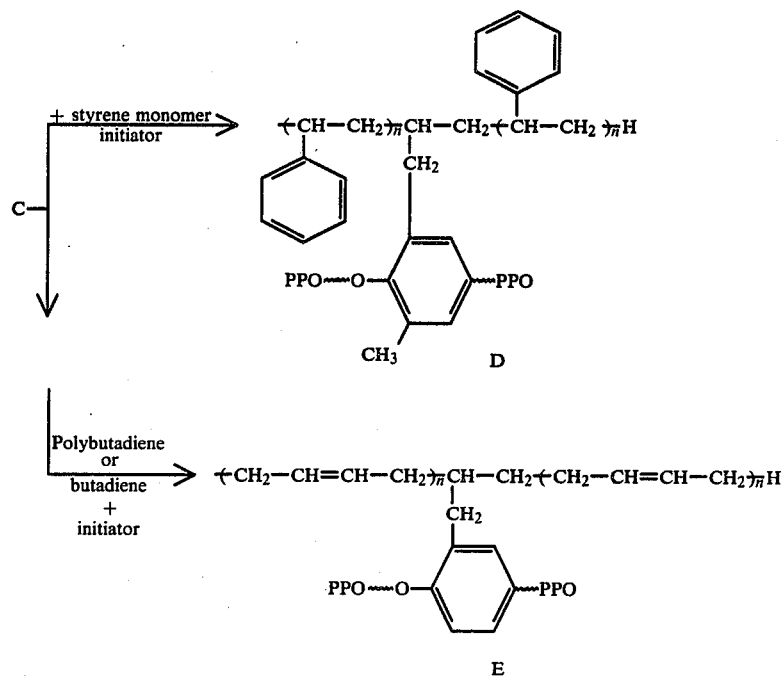

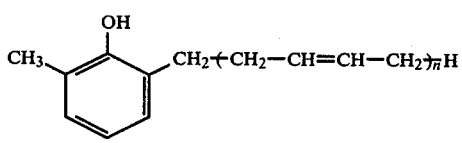

The above reaction sequence is typical of the reaction product of a phenol having formula I, i.e., 2,6-xylenol and an alpha-alkenyl phenol having formula II, i.e., 2-allyl-6-methylphenol. It is, of course, understood that a similar reaction is effected with other reagents embraced by formulae I and II to give corresponding products.

What is significant however is the production of a polyphenylene oxide which is functionalized with an olefinic side chain which is geared for further reaction to provide highly desirable grafted copolymers such as D and E in the above reaction scheme.

Reactant A is a phenol having hydrocarbon substituents in the 2 and 6 positions. Representative of phenols of formula I are 2,6-dimethylphenol, 2,6-diethylphenol, the 2,6-dipropylphenols, the 2,6-dibutylphenols, 2,6-dilaurylphenol, and 2,6-diphenylphenol.

Representative of 2-alkenyl phenols of formula II are: 2-allyl-6-methylphenol, 2-allyl-6-ethylphenol, 2-vinyl-6-methylphenol, 2,6-divinylphenol and compounds of the formula:

wherein n is an integer from 1 to 100.

The manganese (II) chelate complex catalyst used in the copolymerization step is represented by Mn (II) chelates in which the ligand forming said chelates are: benzoin oxime, anisoin oxime, paradimethylaminobenzoin oxime, furoin oxime, acetoin oxime, 2-methyl-2-hydroxy-butan-3-one oxime (also known as methylhydroxybutanone oxime), a alpha-hydroxyacetophenone oxime, 2-methyl-2-hydroxy-4-pentanone oxime, 2-phenyl-2-hydroxybutan-3-one oxime (also known as phenylhydroxybutanone oxime), adipoin oxime, etc.

The relative proportions of copolymer constituents I and II can vary although an employable range is a range of I to II of 1:0.01-5.0 mole percent.

The process by which the copolymerization is effected may be carried out by combining catalyst and monomers in an appropriate organic solvent in the presence of an oxygen containing gas and alkali. Generally, polymerizations may be carried out by combining the catalyst and monomers in an appropriate organic solvent in the presence of an oxygen containing gas. Generally, polymerizations may be carried out using a mole ratio of phenolic monomers to manganese catalyst of from 100:1 to 300:1.

The preferred polymerization solvent is a mixture of a lower alkanol of 1 to 6 carbon atoms, i.e. methanol and an aromatic organic solvent such as toluene, benzene, chlorobenzene, xylene or styrene. The preferred reaction composition of a phenolic monomer, i.e., 2,6-xylenol, a lower alkanol, i.e. methanol, and an aromatic organic solvent is from 20:20:60 to 16:10:74 weight percent respectively. The exact ratios are not critical and may be varied depending on the particular catalyst employed.

The catalyst is dissolved in a lower alkanol such as methanol and is added to the phenolic monomer-organic solvent solution in a reactor that is equipped with an oxygen inlet tube and an appropriate stirring device. In order to increase the stability and reactivity of the catalyst, primary, secondary or tertiary amines such as n-hexylamine may be added to the reaction mixture according to the procedure described in U.S. Pat. No. 3,956,242, which is hereby incorporated by reference. Various amines are mentioned in U.S. Pat. Nos. 3,306,874 and 3,306,875. The amine may be added at a phenol to amine mole ratio within the range of from about 100:0.05 to about 100:15.

The polymerization is initiated by introducing a stream of oxygen at a rate that is sufficient to be in excess over that which is absorbed. Alkali is essential and is preferably added as a 50% aqueous solution of sodium hydroxide sufficient to maintain a mole ratio of 14:1 to 18:1 and more preferably about 16:1 of phenolic compound to hydroxyl ion during the polymerization. Other basic materials are described in U.S. Pat. No. 3,956,242. After initiation of the reaction, the temperature does not exceed substantially 45° C., preferably 35° C. When a polyphenylene oxide having an intrinsic viscosity of about 0.25 to 0.60 dl/g as measured in chloroform at 30° C. is obtained, the reaction may be terminated by adding to the reactor, sufficient aqueous acetic acid or aqueous sulfuric acid to neutralize the reaction media. After neutralization, the entire reaction mixture may be precipitated with a suitable solvent, e.g. methanol, and isolated according to standard techniques.

The resulting copolymer, compound C in the reaction scheme above, due to the side-chain olefinic moiety, can be further treated by a grafting procedure wherein a polyphenylene oxide-polystyrene graft copolymer is formed by reacting the copolymer with styrene under graft polymerization conditions.

Similarly, the formation of a polyphenylene oxide-polybutadiene graft copolymer is synthesized by reacting the copolymer such as C above with butadiene or polybutadiene under graft copolymerization conditions.

EXAMPLE I

Synthesis of copolymer of 2,6-xylenol and 2-allyl-6-methylphenol (5 mole %)

1. Reactants

|  |  |  |
|---|---|---|
|  | toluene | 155 ml |
|  | methanol | 28 ml |
|  | NaOH | 1.2 g |
|  | 2,6 xylenol | 28.50 g (.233 moles) |
|  | 2-allyl-6-methylphenol | 1.82 g (.012 mole) |
| Catalyst at 1500:1 | (total monomer/manganese) |  |
|  | $MnCl_2$ | 0.0206 g |
|  | Benzoin Oxime | 0.0744 g |

2. Procedure

The catalyst and base are dissolved independently of one another in methanol. The 2,6-xylenol is dissolved in 70 ml of toluene and split into two portions: one half is charged into a 3-neck round bottom flask equipped with overhead stirrer and oxygen inlet tube, to the remainder the 2-allyl-6-methylphenol is added. The remaining toluene, base and catalyst solutions are added to the reactor and the oxygen flow initiated. The second portion of monomer is added dropwise over 17 minutes. The temperature is maintained between 25°–30° C. for 50 minutes at which time the base was neutralized stoichiometrically with aqueous acetic acid. The polymer was methanol precipitated and dried. I.V.=0.74.

3. Infrared Analysis of the Copolymer

Bands assignable to C-H bending vibrations are visible in the I.R. of copolymer and are used as evidence that the copolymer was achieved. These bands are normally absent in the PPO homo-polymer.

| Dyer* | 2-allyl-6-methylphenol | copolymer |
|---|---|---|
| $905-915_{cm}{}^{-1}$ | $915_{cm}{}^{-1}$ (S) | $908_{cm}{}^{-1}$ (m) |
| $985-995_{cm}{}^{-1}$ | $\sim 995_{cm}{}^{-1}$ (S) | $\sim 985_{cm}{}^{-1}$ (shoulder) |

*John R. Dyer, Applications of Absorption Spectroscopy of Organic Compounds, Prentice Hall Inc., Englewood Cliffs, N.J. 1965.

4. Graft Polymerization with Styrene

In a three neck flask equipped with an overhead stirrer and nitrogen purge are combined:
50 g PPO (5 mole % 2-allyl-6-methyl copolymer described in Part 1.)
150 g styrene monomer
50 g ethyl benzene
5.0 g benzoyl peroxide.

The reactants are heated at 75°–90° C. for 7 hours after which toluene is added and the product isolated by precipitation in methanol. The composition of the polymer product is 55% PPO and 45% polystyrene.

Although the above example has shown various modifications of the present invention, other variations are possible in light of the above teachings. It is, therefore, to be understood that changes may be made in the particular embodiments of the invention described which are within the full intended scope of the invention as defined by the appended claims.

What is claimed is:

1. A process of preparing copolymers of polyphenylene oxides which comprises contacting a phenol having the formula:

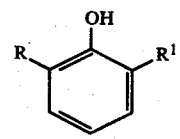

wherein R and R¹ are hydrocarbon radicals, with an α-alkenyl phenol of the formula:

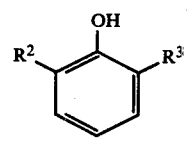

wherein $R^2$ is selected from alkyl having from 1 to 6 carbon atoms and vinyl, and $R^3$ is an unsaturated hydrocarbon radical containing at least one polymerizable double bond in the hydrocarbon chain in the presence of a manganese (II) chelate complex catalyst having the formula $(L)_x Mn$ wherein L is a ligand derived from an ω-hydroxyoxime, Mn is the transition metal manganese (II) and x is a positive number at least equal to about 0.5, a solvent, a base and an oxygen containing gas and thereafter recovering the polyphenylene oxide copolymer from the reaction mixture.

2. The process as claimed in claim 1 wherein the phenol having formula I comprises compounds in which R and R¹ are selected from alkyl containing from 1 to 6 carbon atoms and phenyl.

3. The process as claimed in claim 2 wherein said phenol is 2,6-xylenol.

4. The process as claimed in claim 1 wherein the α-alkenylphenol having formula II comprises compounds in which $R^2$ is methyl or vinyl and $R^3$ is an unsaturated hydrocarbon radical containing at least one polymerizable double bond in the hydrocarbon chain selected from allyl, vinyl and $-CH_2-(CH_2-CH=CH-CH_2)_n-H$ wherein n is an integer from 1 to 100.

5. The process as claimed in claim 4 wherein said α-alkenylphenol is 2-allyl-6-methylphenol.

6. The process as claimed in claim 4 wherein said α-alkenylphenol is 2-vinyl-6-methylphenol.

7. The process as claimed in claim 4 wherein said α-alkenylphenol is 2-vinyl-6-ethylphenol.

8. The process as claimed in claim 4 wherein said α-alkenylphenol is 2,6-divinylphenol.

9. The process as claimed in claim 1 wherein said manganese (II) chelate complex catalyst is benzoin oxime.

10. The process as claimed in claim 1 wherein 2,6-xylenol is copolymerized with 2-allyl-6-methylphenol in the presence of benzoin oxime catalyst.

11. The process as claimed in claim 1 further comprising the step of grafting onto the resulting polyphenylene oxide copolymer, polystyrene or butadiene and recovering grafted copolymer.

12. The process as claimed in claim 11 for the preparation of a polystyrene grafted polyphenylene oxide copolymer which comprises reacting the resulting polyphenylene oxide copolymer with styrene monomer in the presence of a free radical initiator.

13. The process as claimed in claim 11 for the preparation of a polybutadiene grafted polyphenylene oxide copolymer which comprises reacting the resulting polyphenylene oxide copolymer with butadiene monomer or polybutadiene in the presence of a free radical initiator.

* * * * *

UNITED STATES PATENT AND TRADEMARK OFFICE
CERTIFICATE OF CORRECTION

PATENT NO. : 4,207,406
DATED : June 10, 1980
INVENTOR(S) : Walter Karl Olander

It is certified that error appears in the above—identified patent and that said Letters Patent is hereby corrected as shown below:

Column 2, line 14, change "W hydrox-" to -- ω-hydrox- --

Column 2, line 31, change "W-hydroxyoxime" to
-- ω-hydroxyoxime --

Signed and Sealed this

Fifth Day of May 1981

[SEAL]

Attest:

RENE D. TEGTMEYER

Attesting Officer     Acting Commissioner of Patents and Trademarks